United States Patent [19]
Komuro et al.

[11] Patent Number: 4,605,825
[45] Date of Patent: Aug. 12, 1986

[54] FUNCTION KEY ASSIGNMENTS IN A KEY TELEPHONE SYSTEM

[75] Inventors: Isaku Komuro; Yoshikazu Sano; Shinichi Shibata, all of Tokyo, Japan

[73] Assignee: Tokyo Shibaura Denki Kabushiki Kaisha, Kanagawa, Japan

[21] Appl. No.: 586,040

[22] Filed: Mar. 5, 1984

[30] Foreign Application Priority Data

Mar. 3, 1983 [JP] Japan .................................. 58-33782

[51] Int. Cl.⁴ ............................................ H04M 3/32
[52] U.S. Cl. ................................................. 179/99 R
[58] Field of Search ............. 179/99 R, 99 M, 99 LS, 179/99 P, 18 ES, 90 K

[56] References Cited
U.S. PATENT DOCUMENTS

| | | | |
|---|---|---|---|
| 3,660,611 | 5/1972 | Knollman et al. | 179/18 ES |
| 4,046,972 | 9/1977 | Huizinga et al. | 179/99 |
| 4,096,359 | 6/1978 | Barsellotti | 179/99 |
| 4,196,316 | 4/1980 | McEowen et al. | 179/18 ES |
| 4,203,011 | 5/1980 | Coviello | 179/99 M |
| 4,453,040 | 6/1984 | Wolf et al. | 179/81 C |

Primary Examiner—James L. Dwyer
Attorney, Agent, or Firm—Banner, Birch, McKie & Beckett

[57] ABSTRACT

In a key telephone system, function assignments are made for assignable-function keys by assigning to each key telephone set one of a number of previously-stored patterns of function assignments. Patterns are stored in a memory of the main unit of the key telephone system. Assignment of functions is thereby done more easily, and efficiency of office line use may be improved.

7 Claims, 15 Drawing Figures

| FLASH | | FLASH | | FLASH | | CO 9 |
|-------|---|-------|---|-------|---|------|
| DND | | DND | | DND | | CO 10 |
| CO 1 | | CO 1 | | CO 8 | | CO 11 |
| CO 2 | | CO 2 | | CO 9 | | CO 12 |
| CO 3 | | CO 3 | | CO 10 | | CO 13 |
| CO 4 | | CO 4 | | CO 11 | | CO 14 |
| CO 5 | | CO 5 | | CO 12 | | AD 1 |
| CO 6 | | AD 1 | | CO 13 | | AD 2 |
| CO 7 | | AD 2 | | CO 14 | | AD 3 |
| INT 1 | | INT 1 | | INT 2 | | INT 2 |
| (a) | | (b) | | (c) | | (d) |

FIG. 6

| CO 9 | FLASH | | DND | FLASH | | CO 10 | CO 1 |
|------|-------|---|-----|-------|---|-------|------|
| CO 10 | DND | | AD 1 | CO 1 | | CO 11 | CO 2 |
| CO 11 | CO 1 | | AD 2 | CO 2 | | CO 12 | CO 3 |
| CO 12 | CO 2 | | AD 3 | CO 3 | | CO 13 | CO 4 |
| CO 13 | CO 3 | | AD 4 | CO 4 | | CO 14 | CO 5 |
| CO 14 | CO 4 | | AD 5 | CO 5 | | AD 5 | AD 1 |
|  | CO 5 | | AD 6 | CO 6 | | AD 6 | AD 2 |
|  | CO 6 | | AD 7 | CO 7 | | AD 7 | AD 3 |
| INT 1 | CO 7 | | AD 8 | CO 8 | | AD 8 | AD 4 |
| INT 2 | CO 8 | | INT 2 | INT 1 | | INT 2 | INT 1 |
| (a) | | | (b) | | | (c) | |

FIG. 7

FUNCTION KEY ASSIGNMENTS IN A KEY TELEPHONE SYSTEM

BACKGROUND OF THE INVENTION

This invention relates to the assignment of functions to assignable-function keys on a key telephone.

A typical key telephone system comprises a main unit, which performs certain control functions such as telephone call routing, and a plurality of key telephone sets connected to the main unit. Typically, the functions performed by corresponding keys on the various key telephone sets are identical, and all function keys are assigned a function. This arrangement simplifies the operation of the key telphone system but suffers the disadvantage that, when a new function is to be added, a new function key must be added to each key telephone set. Providing additional keys is extremely inconvenient, at best.

One way to overcome this problem would be uniformly to assign functions in advance to most, but not all, of the assignable-function keys on each set in the system, leaving the remainder of such keys to be assigned later in accordance with the individual user's special requirements. Pre-assigned keys might be, for example, the office line keys (those which connect the telephone set to the various outside lines) and the extension line keys (those which connect the telephone set to various intra-office extension lines). This arrangement would satisfy at least the minimum initial requirements for operation of the system and allow the flexibility to add special functions as necessary for individual sets, for example abbreviated dialing or hands-free operation. The disadvantage of this arrangement is that the programming of assignable-function keys which have not been assigned in advance must be done individually for each unassigned key on a telephone set. The assignment operation therefore takes a great deal of time, especially if the number of keys on each set which are not pre-assigned is large.

A similar difficulty arises in key telephone systems in which all telephones are not identical, i.e., the different sets have different numbers of assignable-function keys. In such a system, normally phones which are used more frequently will have more function keys and be assigned more office lines or special functions than other key telephone sets. The less frequently used telephone sets, having fewer function keys, are less expensive. As can be expected, however, much time is spent in assigning the various function keys in such a system, since the number of pre-assigned functions is necessarily limited to the smallest number of keys on any single keys telephone set. (Obviously, if even fewer keys are to be pre-assigned, much more work must be done to program the assignable-function keys.)

An additional difficulty in a key telephone system in which the telephone sets have varying numbers of assignable-function keys occurs when certain office lines are assigned to certain keys. Those office lines which are pre-assigned may be connected to all key telephone sets and are therefore much more heavily used than office lines which are individually assigned and may therefore be limited to only a few key telephone sets. The overall efficiency of office line use is therefore reduced.

In summary, the two principal difficulties with a key telephone system which uses telephones having varying numbers of assignable-function keys are that the operation of assigning the functions to the keys is very time-consuming and that the efficiency of using office lines is reduced.

SUMMARY OF THE INVENTION

One object of the present invention is to improve the efficiency of office line use in a key telephone system.

Another object of the present invention is to facilitate the process of assigning functions to assignable-function keys in a key telephone system.

In this invention, a memory of the main unit of the key telephone system stores a plurality of patterns of function key assignments. One of the stored patterns is then assigned to each key telephone set in the system, and the functions of all keys of the set are therefore assigned at once.

BRIEF DESCRIPTION OF THE DRAWINGS

FIG. 6 illustrates some of the possible patterns of assignment data which may be assigned to key telephone sets having ten function keys.

FIG. 7 illustrates some of the possible patterns of assignment data which may be assigned to key telephone sets having twenty function keys.

DETAILED DESCRIPTION OF THE PREFERRED EMBODIMENT

Figure 1:
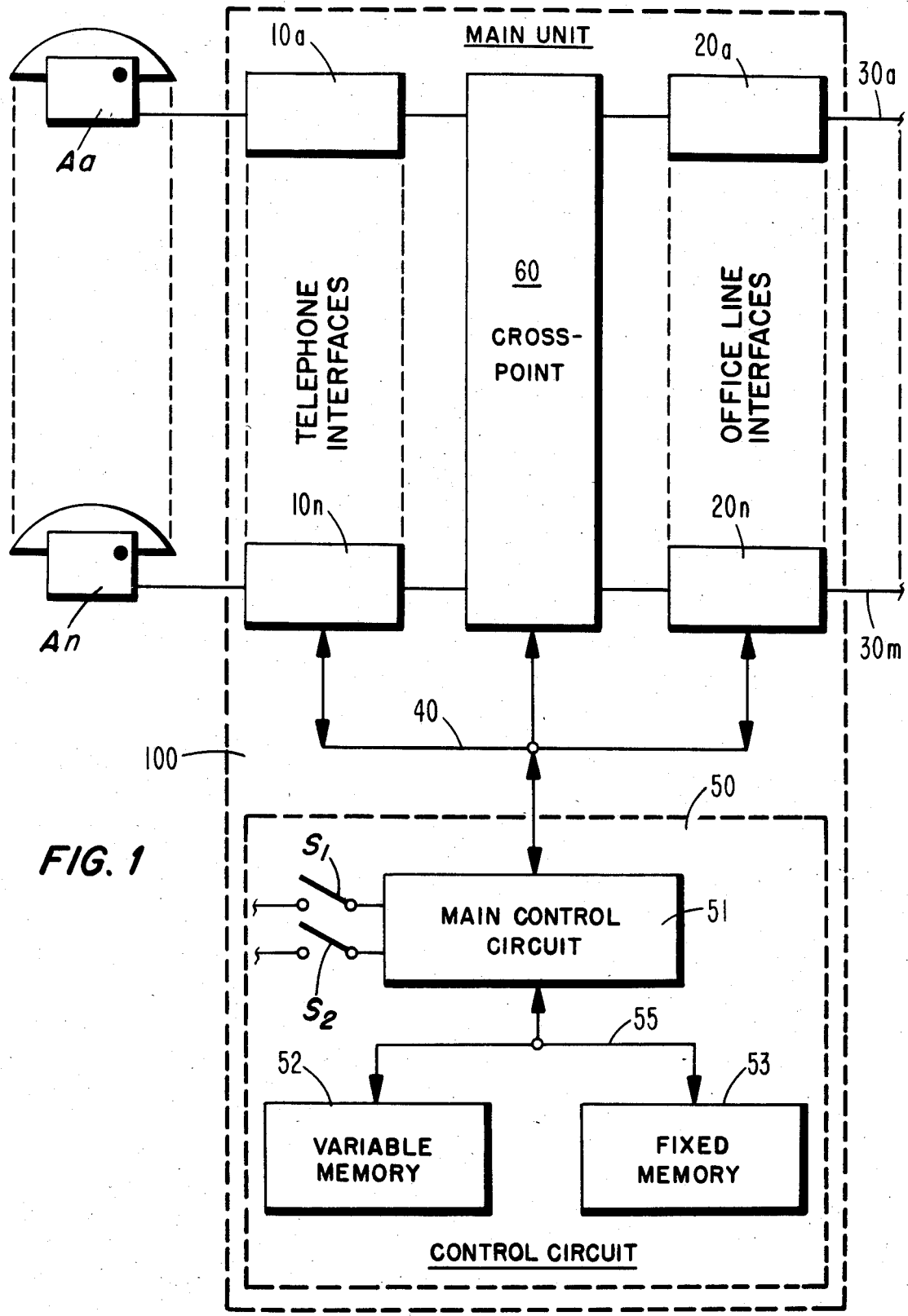
FIG. 1 is a simplified block diagram of a key telephone system to which the present invention is applied.

FIG. 1 is a block diagram of a key telephone system to which this invention pertains. Main unit 100 interconnects m office lines $30_a$–$30_m$ and n telephone sets $A_a$–$A_n$. Main unit 100 comprises cross-point 60, control circuit 50, telephone interfaces $10_a$–$10_n$, and office line interfaces $20_a$–$20_m$. (Telephone interfaces 10 are respectively connected between cross-point 60 and telephone sets A; office line interfaces 20 are respectively connected between cross-point 60 and office lines 30.)

Cross-point 60, telephone interfaces 10, and office line interfaces 20 are connected through bus 40 to, and are controlled by, control circuit 50. The control circuit includes main control circuit 51, variable memory 52 (for example, a random access memory—RAM), fixed memory 53 (for example, a read only memory—ROM), first switch $S_1$ and second switch $S_2$. Main control circuit 51, which performs processor functions, is connected to switches $S_1$ and $S_2$ which are manually actuated for various purposes to control main unit 100. In conjunction with switches $S_1$ and $S_2$, main unit 100 is controlled by a program stored in variable and fixed memories 52 and 53, which are connected through internal bus 55.

Variable memory 52 stores at least operating data which is referred to by main control circuit 51 during operation of the key telephone system. Fixed memory 53 stores reference operating data corresponding to the operating data stored in variable memory 52, a program for operating main control circuit 51 as a processor, a plurality of patterns of assignment data for assignable-function keys, and other data which is non-operational in nature. The reference operating data stored in advance is default data which would be satisfactory as operating data for the key telephone system for the majority of general purpose users.

Figure 2:
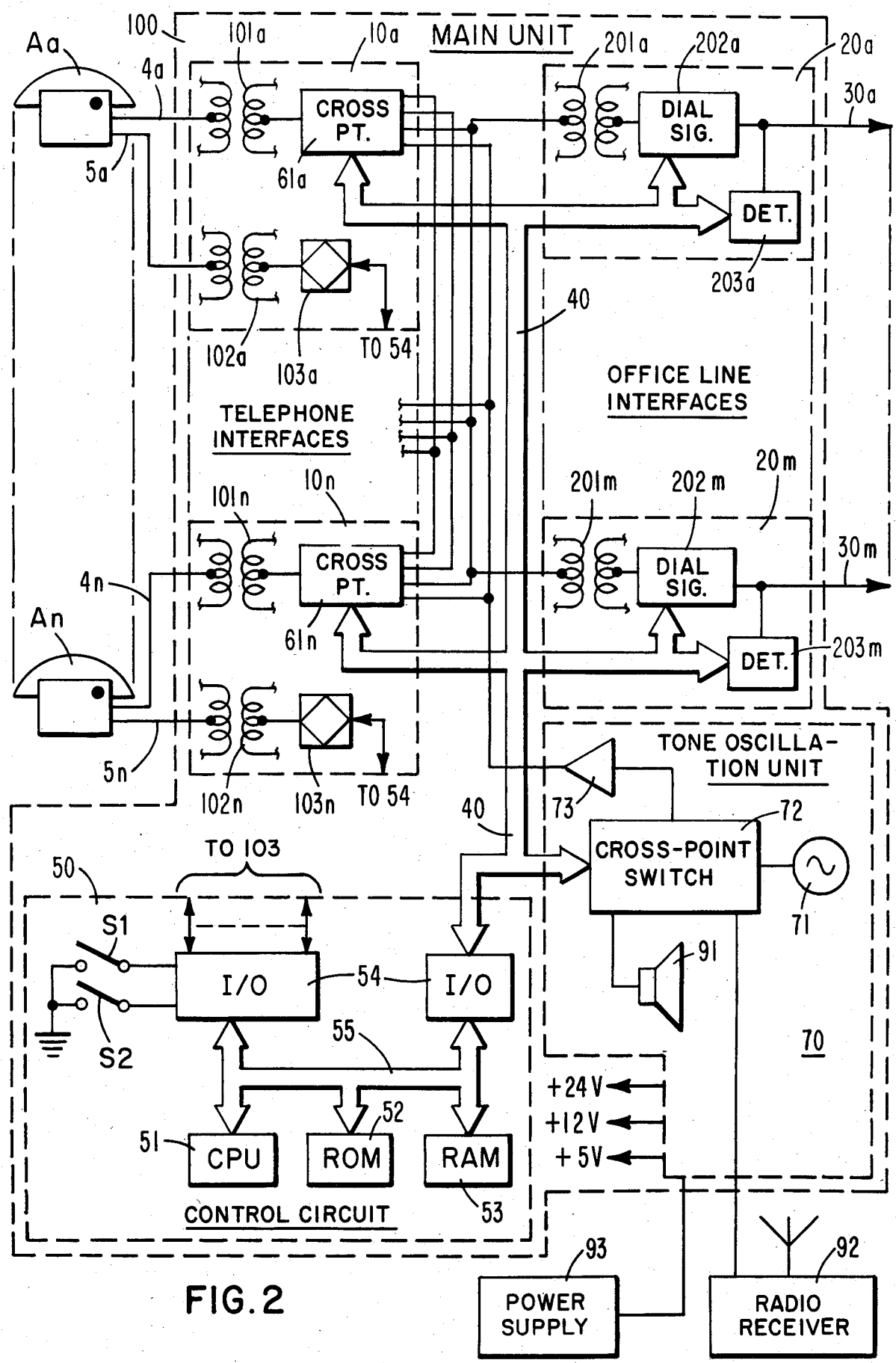
FIG. 2 is a more detailed block diagram of the key telephone system of FIG. 1.

FIG. 2 illustrates the system of FIG. 1 in more detail. Main unit 100 includes a plurality of telephone interfaces $10_a$–$10_n$ corresponding to key telephone sets $A_a$–$A_n$, a plurality of office line interfaces $20_a$–$20_m$ corresponding to office lines $30_a$–$30_m$, a tone oscillation unit 70, and a control circuit 50. Telephone interfaces 10 enable key telephone sets A to be connected to office lines 30, other key telephone sets A, or other equipment. Each telephone set interface 10 has a voice signal transformer 101, a data transformer 102, and a data interface 103. Voice signals arriving from key telephone set A on voice signal line 4 pass through voice signal transformer 101 to cross-point switch 61; similarly, data arriving along data line 5 from key telephone set A pass through data transformer 102 and data interface 103 to control circuit 50.

Each office line interface 20 has a voice signal transformer 201, a dial signal oscillation circuit 202, and an incoming signal detector circuit 203. Dial signal oscillation circuits 202 are connected through voice signal transformers 201 to cross-point switches 61; incoming signal detector circuits 203 are connected to the corresponding office lines 30 to detect signals arriving thereon. Tone oscillation unit 70 includes oscillator 71 which generates a ringing tone, extension cross-point switch 72, and extension amplifier 73. The primary functions of tone oscillation unit 70 are to generate a ringing tone and to control the connection of extensions. Also connected to extension cross-point switch 72 are an external paging speaker 91 and a radio broadcast receiver 92 which furnishes music on hold. An external power supply 93 connected through tone oscillation unit 70 supplies power at 24 volts, 12 volts, and 5 volts to the various sections of the telephone system.

Control circuit 50 functions as a microcomputer and includes central processing unit (CPU) 51, ROM 52, RAM 53, input/output interfaces (I/O) 54 and internal bus lines 55 interconnecting the various units. Control circuit 50 is connected through internal bus line 40 to cross-point switches 61, external cross-point switch 72, dial signal oscillation circuits 202 and incoming signal detector circuits 203, and controls the operations of these units.

Figure 3:
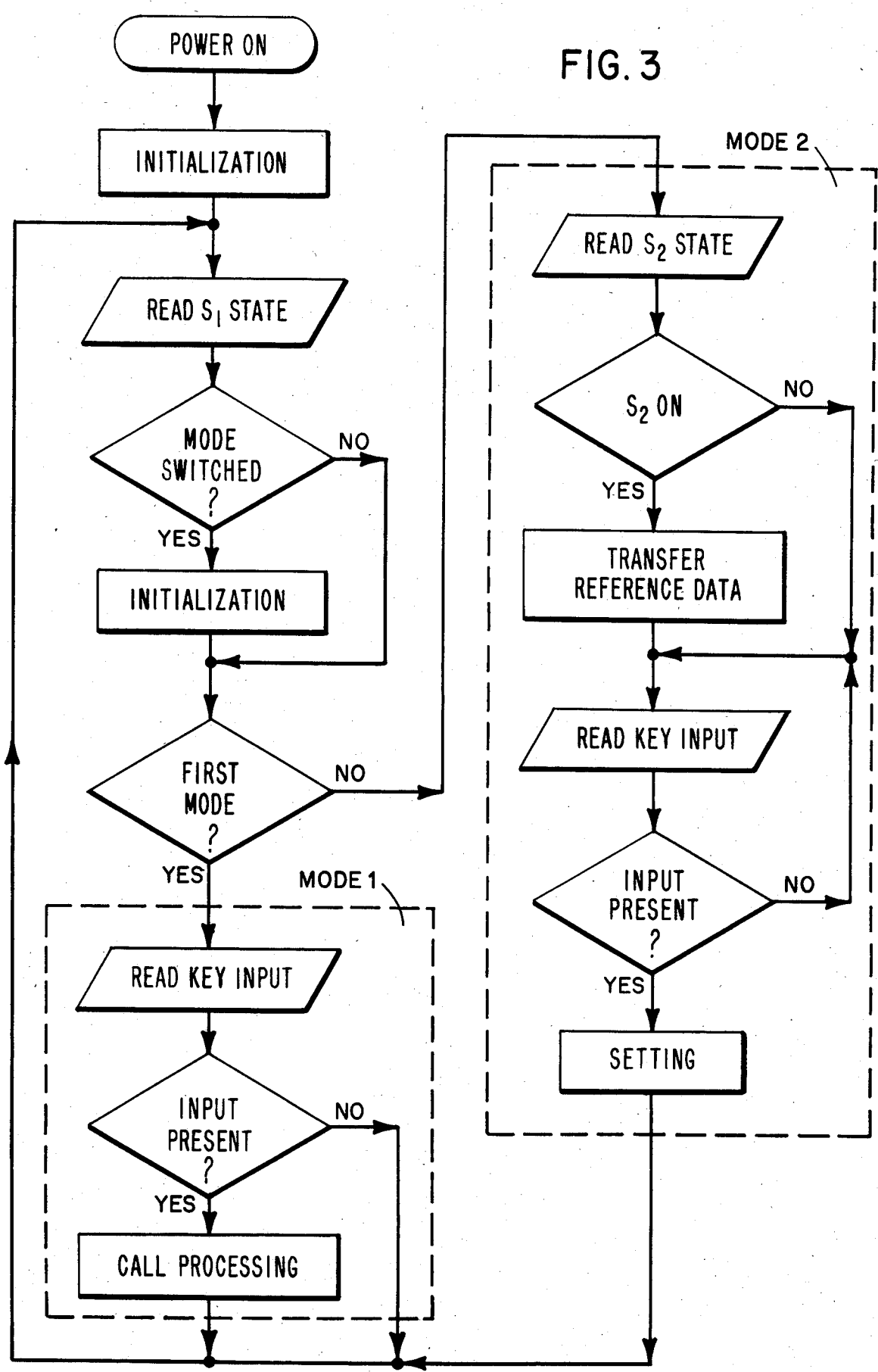
FIG. 3 is a simplified flow chart illustrating the operation of the key telephone system of FIG. 1.

The key telephone system of FIGS. 1 and 2 is operated as shown in the flow chart of FIG. 3. The operating program shown in FIG. 3 is stored in fixed memory 53. Upon the addition of power, main control circuit 51 performs a predetermined initialization routine, including the resetting of registers and flags in main control circuit 51. At the conclusion of this routine, circuit 51 determines the state of switch $S_1$, identifying whether that state has changed since the previous determination. If it has, the initialization routine is performed again, resetting the contents of the registers and flags used previously by main control circuit 51, disconnecting the lines of the respective key telephone sets, and turning on or off the indicator lights of each telephone set so as to provide a new operating mode.

The next step is to determine which operating mode has been set by $S_1$. If the switch is off, the first mode has been selected, which is the normal operating, or call processing, mode. When an operator desires to set the operating data in the key telephone system, he switches $S_1$ on, selecting the second, or data setting, mode.

If mode 1 has been selected, main control circuit 51 looks for any key inputs from the connected key telephone sets and, if there are any, performs the necessary steps to process calls being sent or received. If no key inputs are present, the program returns to the step of determining the state of switch $S_1$.

If switch $S_1$ is turned on, indicating that the operator has selected the second mode, main control circuit 51 then determines the state of switch of $S_2$ in order to decide whether the operator wishes to have reference operating data transferred from fixed memory 53 to variable memory 52.

As noted above, this reference operating data is sufficient to place the key telephone system in operation and satisfty a variety of general users. If, however, in certain cases, this data is unsatisfactory, it may be changed in the next program step.

Main control circuit 51 waits for inputs from a predetermined key telephone set A which is used to set operating data. When input is present, the data is set in variable memory 52, and the program returns to the step of determining the state of $S_1$. It is in the second mode where assignments are made of the functions to be performed by the programmable function keys.

Figure 4:
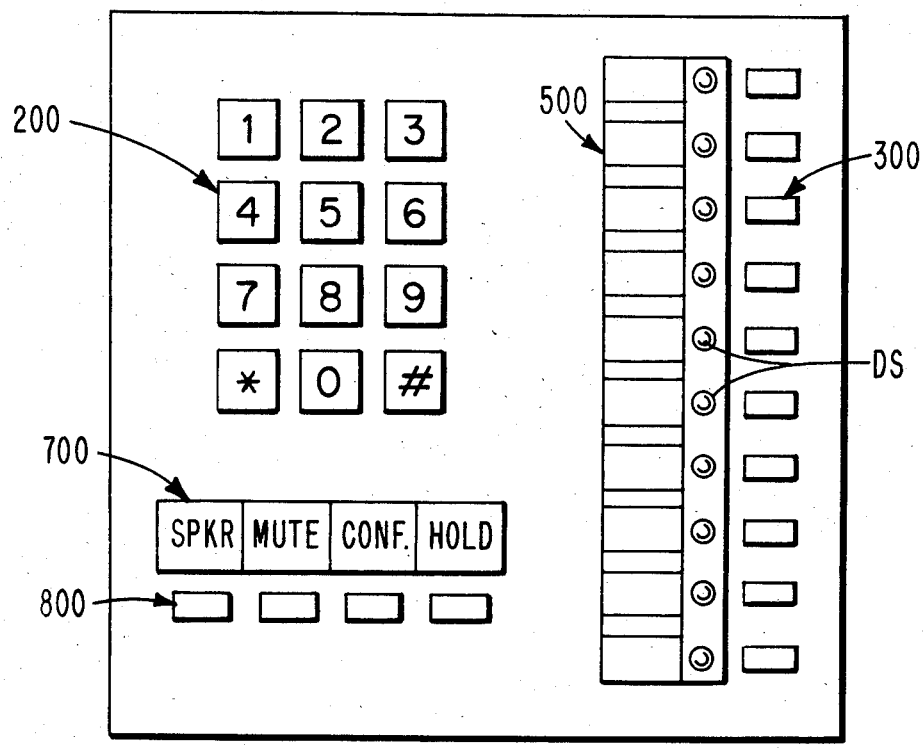
FIGS. 4 and 5 are examples of the front panel layout of two types of key telephone sets, the set of FIG. 4 having ten assignable function keys and the set of FIG. 5 having twenty assignable function keys.
Figure 5:
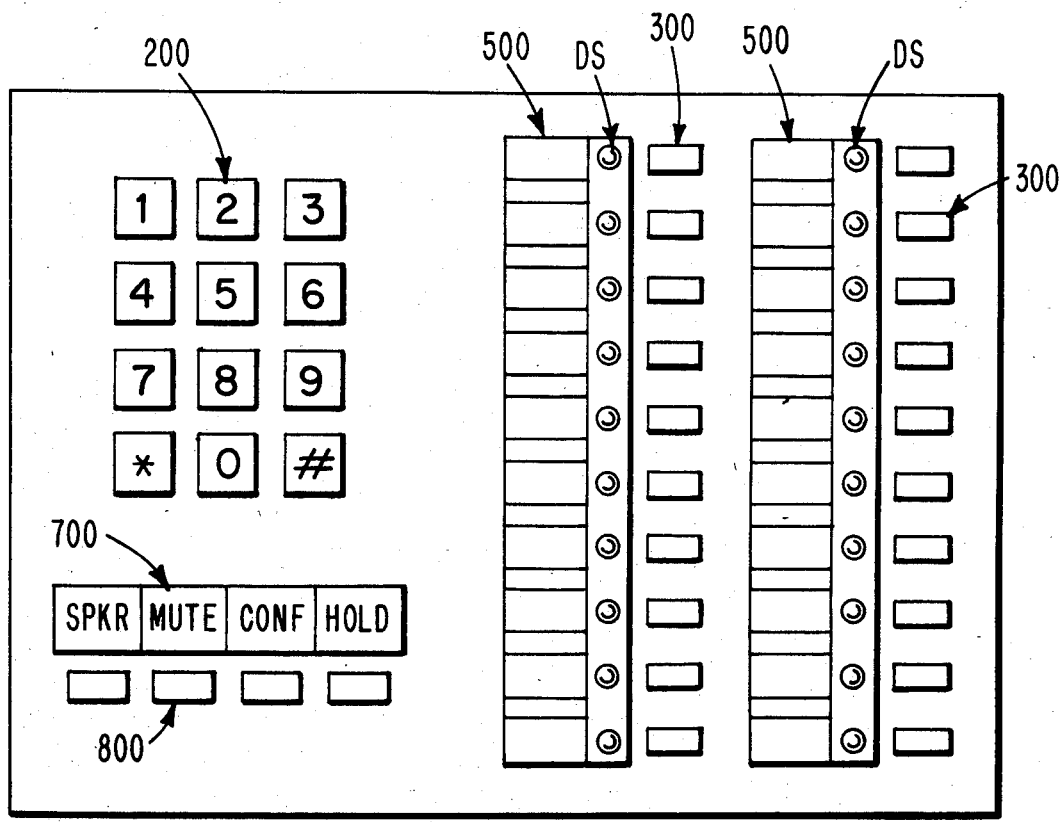

FIG. 4 illustrates the front panel of one typical key telephone set for use in this system. There are three groups of keys: the first group 200, or the numerical keypad, which comprises numeric keys 0-9, * and #; the second group 800, which comprises the four fixed function keys SPKR, MUTE, CONF, and HOLD; and the third group 300 comprising ten assignable-function keys. The front panel illustrated in FIG. 5 is similar to the front panel of FIG. 4 except that there are twenty keys in the third group 300, that is, twenty keys whose functions may be assigned, rather than ten.

The first group 200 functions in the conventional manner with which telephone users are familiar. Functions of the second 800 and third 300 groups of keys are described in Table 1 below.

TABLE 1

| KEY | FUNCTION |
| --- | --- |
| SPKR | Hands-free calling |
| MUTE | Inhibiting microphone operation |
| CONF | Releasing privacy between specific telephone sets |
| HOLD | Temporarily disconnecting the selected office line |
| INT1, INT2 | Selecting extension line |
| $CO_1$-$CO_{14}$ | Selecting office line |
| DND | Inhibiting ringing |
| FLASH | Disconnecting the line for a predetermined short period of time |
| $AD_1$-$AD_8$ | Abbreviated dialing |

The keys of the first group 200 are labelled by indications imprinted directly on the keys. The keys of the second 800 and third 300 groups are labelled, as to their functions, by removable labels 700 and 500, respectively, adjacent the second and third groups of keys.

Also included on the front panel are indicators DS adjacent each key of the third group. Indicators DS may be, for example, light-emitting diodes (LEDs).

Figure 8:
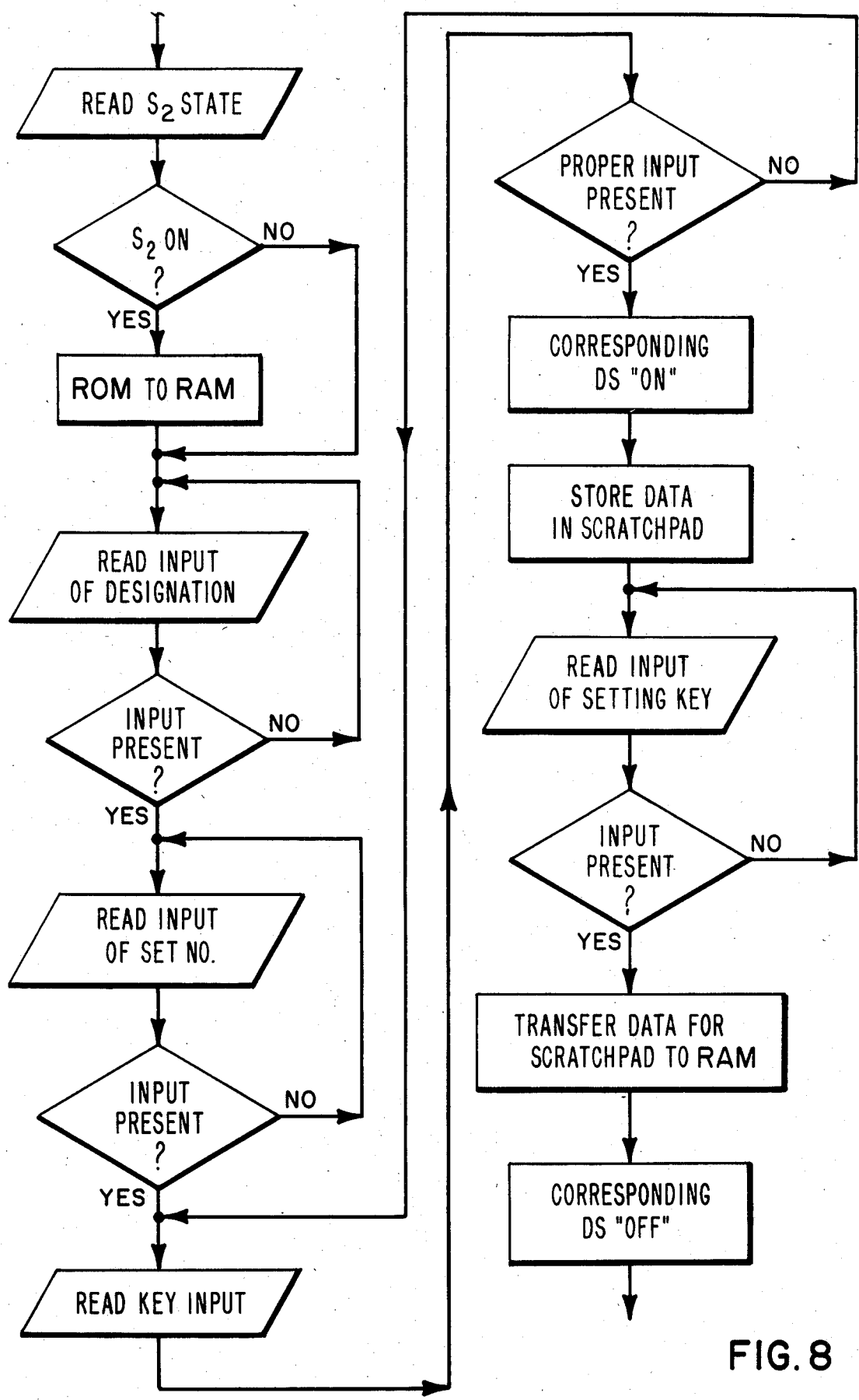
FIG. 8 is a flow chart showing in more detail the steps labelled as "mode two" in FIG. 3.

FIG. 8 shows in detail the steps taken in the second mode (operating data setting mode) of operation of the key telephone system. As explained in connection with FIG. 3, the second mode is selected when the operator switches $S_1$ on. Main control circuit 51 then reads switch $S_2$ to determine whether the reference operating data stored in fixed memory 53 is to be transferred to variable memory 52. After any necessary transfer has been accomplished, main control circuit 51 waits for operator input to the first group of keys 200 of a predetermined one of the key telephone sets A. This predetermined set need not have any special features but may be any of the ordinary key telephone sets which has been selected for the special purpose of setting operating data. There may be more than one of these predetermined key telephone sets. When operating data is being set from one of them, the use of all other key telephone sets is inhibited by main control circuit 51, for example by returning a "busy" signal to them.

The first input supplied by the operator is a numeral designating that function assignments are being made for a key telephone set. For example, if the command designating the assignment of key functions is "04," the operator may input this command to the numerical keypad (first group 200). Next, the number of the key telephone set A whose operating data is being set is keyed in through the numerical keypad. Main control circuit 51 then waits for key input indicating which pattern of assignment data is to be assigned to the selected key telephone set. The various patterns may be selected by the operator by depressing keys of the third group 300. Some or all of these keys, when the predetermined key telephone set is operating in the second mode, designate the available patterns of assignment data which can be set into the system's key telephone sets A. Patterns are stored in fixed memory 53. If the operator presses one of the function keys 300 corresponding to an assignment pattern which may be assigned to the selected key telephone set A, the corresponding indicator DS on the predetermined set will be illuminated and the pattern data will be transferred from fixed memory 53 to a register in main control circuit 51. If, however, the operator presses one of the function keys 300 corresponding to an assignment pattern which is not assignable to the selected key telephone set A, the corresponding indicator DS will not be illuminated. This alerts the operator to choose a different pattern by means of a different one of keys 300.

If the selected pattern is assignable to the selected key telephone set, it will be stored in a scratch pad register of main control circuit 51. The next step in assigning functions is to press a predetermined setting key, for example the HOLD key of the predetermined key telephone set. This transfers the pattern stored in the scratch pad register to an area of variable memory 52 corresponding to the selected key telephone set. At the same time, the indicator DS which was illuminated is turned off, indicating to the operator that function assignment for the selected key telephone set is complete. In a similar manner, function assignments may be made individually for all key telephone sets in the system.

It is also possible to assign the same pattern of functions to several key telephone sets at once. In the flow chart of FIG. 8, when the step of "read input of set number" is reached, the operator may input keystrokes designating a group, rather than a single one, of the key telephone sets A. Or, the operator may sequentially input the numbers of several individual key telephone sets A, all of which are to have the same pattern of assignment data.

When assigning functions of a number of key telephones at once, it may happen that the selected pattern of function assignment data includes more or fewer functions than there are assignable keys on one of the telephones selected. When this happens, the pattern selection is not invalidated (as it is when only a single telephone's functions are being assigned), but assignments are made in accordance with a predetermined protocol. Where the number of assignable keys is greater than the number of functions in the pattern, keys for which there is no corresponding function assignment are simply rendered inactive. Where the number of assignable keys is less than the number of functions in the pattern, the available keys are assigned functions from only a part of the pattern.

Figure 9:
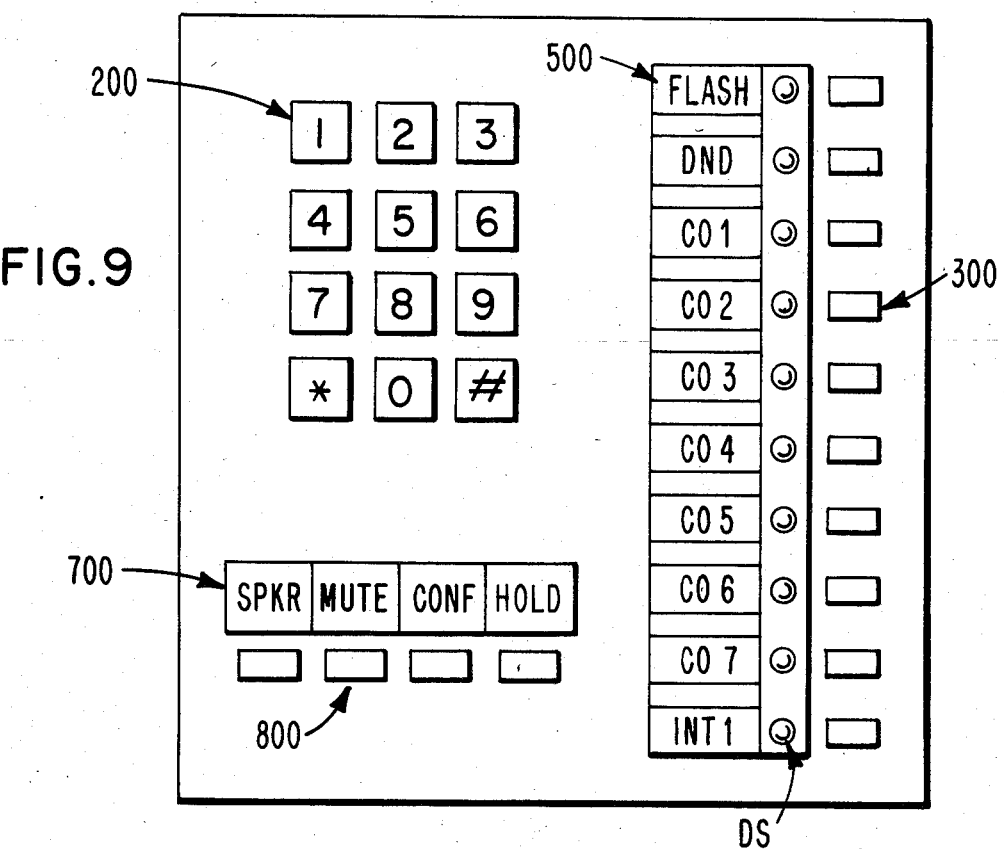
FIGS. 9 and 10 are examples of the front panel layout of the key telephone sets shown in FIGS. 4 and 5, with function keys assigned.
Figure 10:
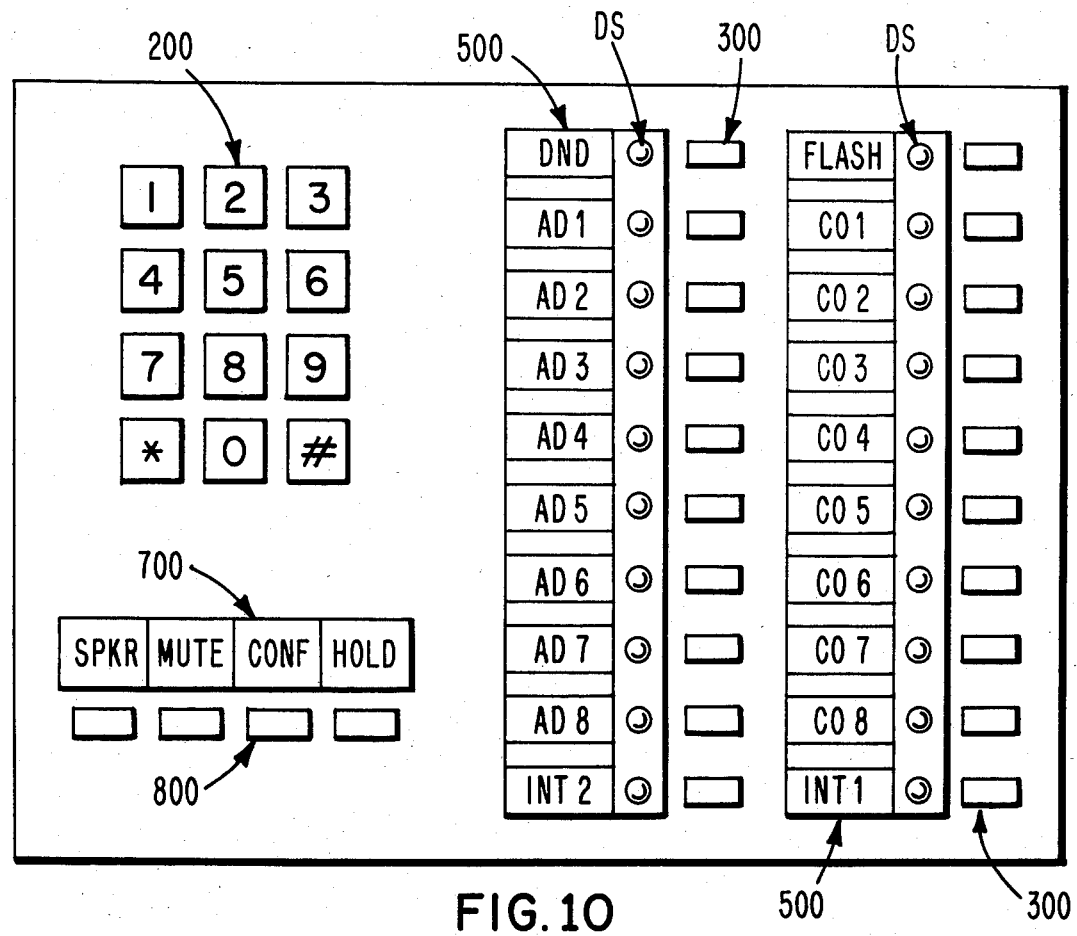

After a pattern of functions has been assigned to a selected key telephone set A, the functions of the assignable function keys 300 are indicated visually on labels 500 adjacent the keys. For example, if the pattern of functions shown in FIG. 6(a) is assigned to a key telephone set having a front panel as shown in FIG. 4, labeling would be done as shown in FIG. 9. Labels 500 may be attached in any well known manner.

Figure 11:
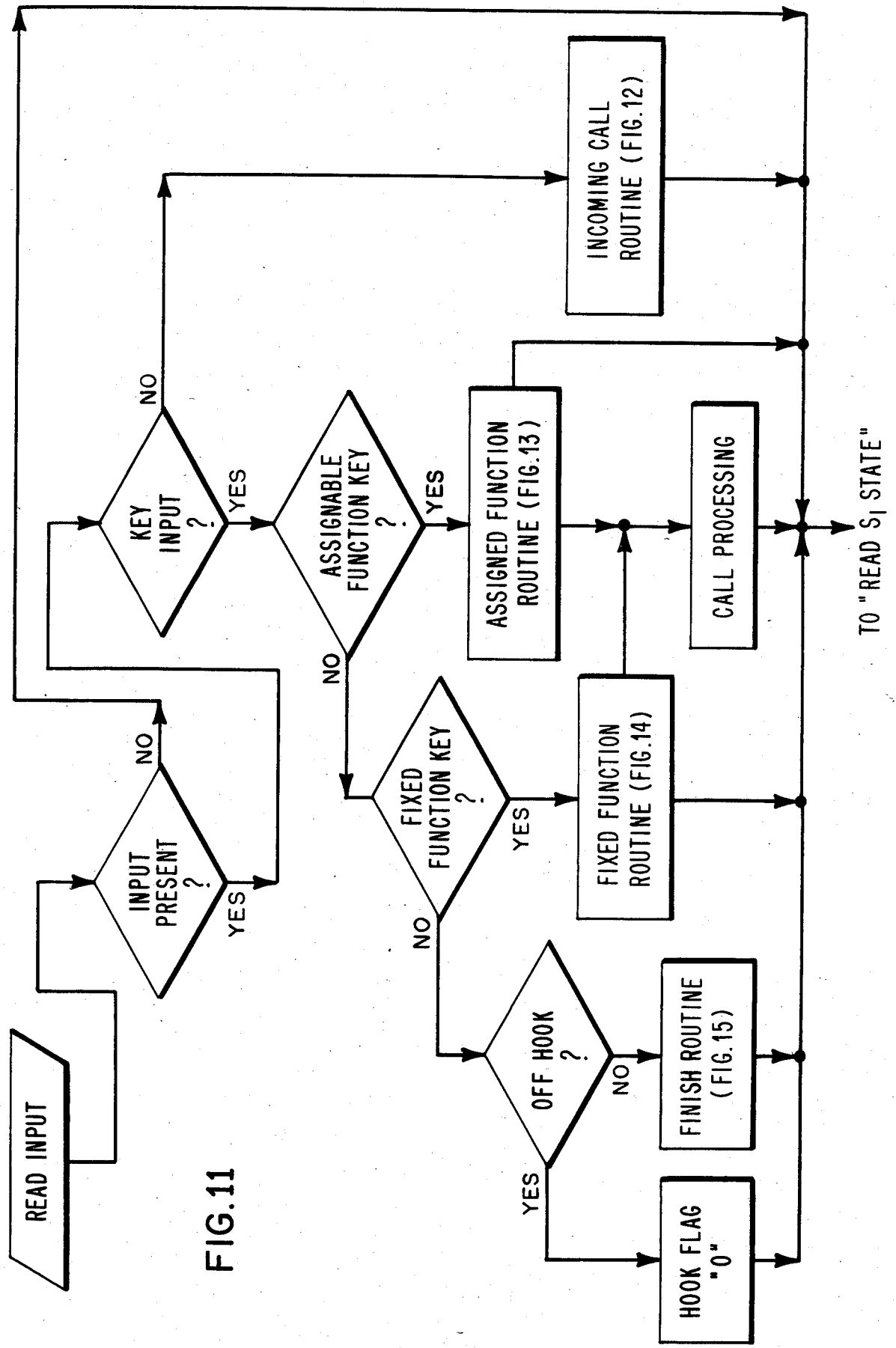
FIG. 11 is a flow chart showing in more detail the steps labelled as "mode one" in FIG. 3.

The remainder of this discussion concerns the call processing mode (Mode 1 shown in FIG. 3). FIG. 11 is a flow chart of Mode 1, while FIGS. 12-15 are more detailed flow charts of the incoming call routine, the assigned function routine, the fixed function routine, and the finish routine, all of which are shown as steps in FIG. 11.

Incoming Call

When a ringing signal arrives on an office line 30, this signal is supplied to main control circuit 51 via the appropriate office line interface 20 and bus 40. Since input is present, but it is not key input, the program branches to the incoming call routine.

Figure 12:
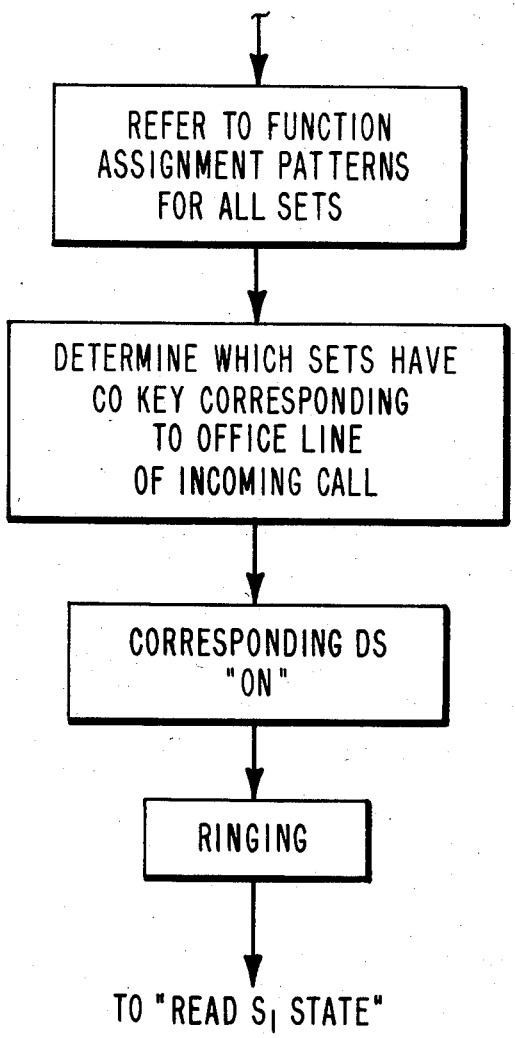
FIGS. 12–15 are details of the flow chart of FIG. 11.

In this routine, shown in FIG. 12, main control circuit 51 refers to the function assignment patterns stored in variable memory 52 in order to determine which key telephone sets(s) have a "CO" key corresponding to the office line 30 on which the incoming call is arriving. It will be assumed here that the particular key is the CO1 key. Main control circuit 51 causes the indicator DS adjacent the CO1 key on each key telephone set which has such a key to flash, indicating an incoming call on that line. In addition, those key telephone sets which are designated to ring for such a call are caused to ring.

Answering Incoming Call

When the handset of a key telephone set A having a CO1 key is taken off-hook, the off-hook signal (which is considered to be key input) is sent to main control circuit 51 via telephone interface 10 and bus 40. Since the hook switch is neither an assignable function key nor a fixed function key, the program reaches the decision "off-hook" and, accordingly, sets the hook flag of the key telephone set A to zero. (There is a flag in variable memory 52 corresponding to each possible key input of every key telephone set A.)

When the CO1 key of the off-hook key telephone set is depressed, main control circuit 51 reads this input as that of an assignable function key and branches to the assigned function routine. In this routine, shown in FIG. 13, main control circuit 51 first refers to the pattern of function key assignments stored in variable memory 52 for the particular key telephone set on which the CO1 key was depressed. Since the key is not the DND key, and the hook flag is off, the step of data processing comprises setting the CO1 key flag to 1. Then main control circuit 51 refers to the function assignment patterns for all other key telphone sets, determines which ones have a CO1 key, and illuminates the indicator DS corresponding to the CO1 key, indicating that a conversation is taking place on that office line.

Following the assigned function routine, main control circuit 51 performs the step of "call processing," in which the particular office line 30 and key telephone set A are connected to each other via an office line interface 20, cross point 60, and a telephone interface 10. In this manner, the connection is completed, and a communication path is formed.

Outgoing Call Origination

It will be assumed here that it is desired to originate an outgoing call on the office line 30 corresponding to a CO2 key from a key telephone set A having such a key. When the receiver is taken off-hook, the off-hook signal is received in main control circuit 51, which then sets the hook flag to zero as described above.

Figure 13:
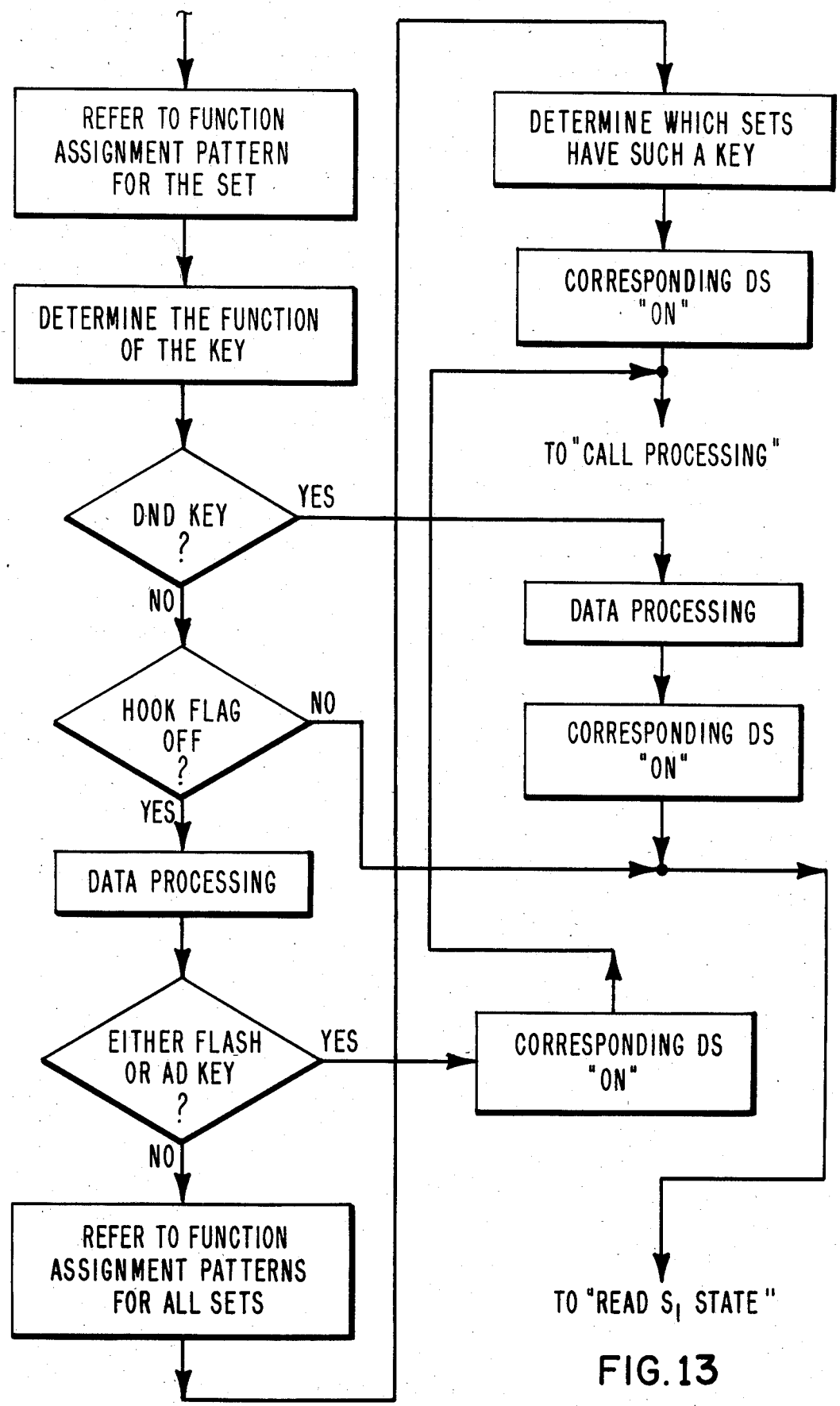
Figure 14:
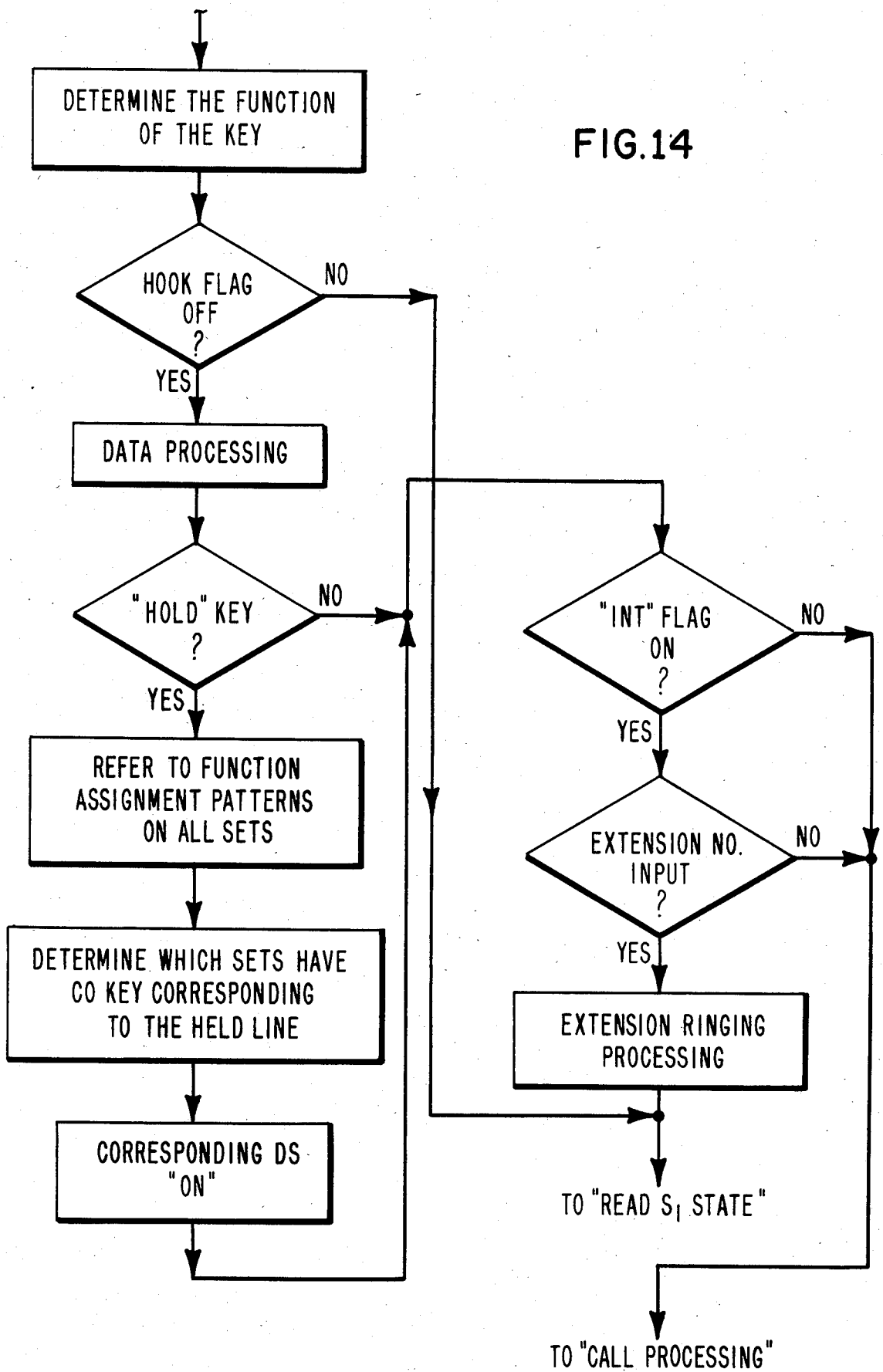

The operator then depresses the CO2 key, and the program branches to the assigned function routine (FIG. 13). Since the key is not the DND key and the hook flag is off, the program reaches the step of "data processing" in which the CO2 key flag is set to 1. The program next determines that neither FLASH nor an AD key was depressed and, by reference to the stored function assignment patterns of all key telephone sets, illuminates the indicator DS corresponding to the CO2 key on all sets having such a key to indicate that that office line is busy.

Main control circuit 51 then performs the step of "call processing." The particular office line 30 and key telephone set A are interconnected via an office line interface 20, cross point 60, and a telephone interface 10. In this manner, the connection of key telephone set A to office line 30 is completed, and it is then possible to send switching signals, that is, to switch lines of the telephone network in order to reach another telephone set.

Switching signals are sent, for example, by depressing keys in the first group of keys 200. When switching is done in this manner, main control circuit 51 performs the steps of FIG. 11, branching to "YES" when it reaches the decision "fixed function key?" This causes the fixed function routine (FIG. 14) to be performed. Since the hook flag is off, an input from numerical keypad 200 is stored during the "data processing" step. The program branches to NO for the decisions "HOLD key" and "INT flag on," reaching the step of "call processing". Here, main control circuit 51 drives the external switching tone generator, transmitting the switching tone corresponding to the stored switching data on the selected office line 30. After all switching signals have been transmitted in this manner, a busy signal will be received on office line 30 if the called station is busy, and a ring back tone if it is not.

Abbreviated Dialing

For key telephone sets having AD keys, switching can be expedited by storing in advance those numbers which are most frequently used. When the receiver is removed from the hook switch and an AD key is depressed, main control circuit 51 proceeds through the program steps shown in FIG. 11 to the assigned function routine (since the AD keys are assigned). In this routine, shown in FIG. 13, main control circuit 51 first determines that the depressed key is an AD key and that the hook flag is off (set to zero); then, during the "data processing" step, it sets the flag corresponding to the selected AD key to 1. Next, determining by reference to the AD flag that an AD key has been depressed, main control circuit 51 causes the corresponding indicator DS to be illuminated and then proceeds to the step of "call processing" . During call processing, the previously stored switching data are retrieved and used to control the external switching tone generator.

Call Termination

Figure 15:
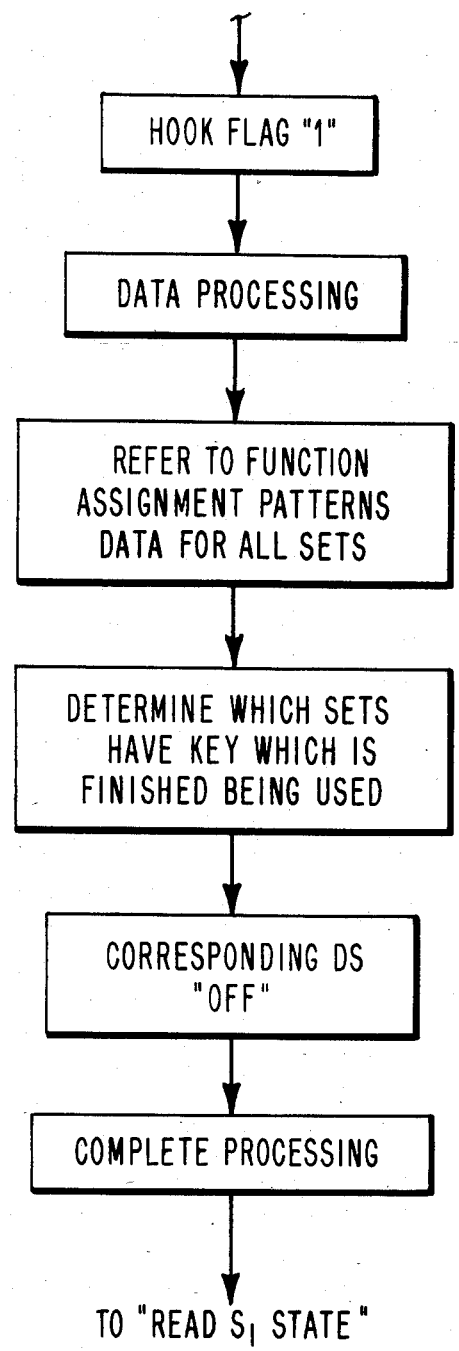

When the receiver is placed on the hook switch, this input is sent to main control circuit 51, which proceeds through the steps shown in FIG. 11 to the finish routine (FIG. 15). First, the hook flag for the particular key telephone set A is set to "one." Next, the flag for the CO key corresponding to the office line 30 which was in use is set to "zero" during the step of "data processing." Referring to the stored function assignment patterns for all key telephone sets, main control circuit 51 then extinguishes the indicators DS next to the same CO key on all key telephone sets. Finally, during the step "complete processing," the connection between the particular key telephone set A and office line 30 is broken.

HOLD

Depression of the HOLD key during a telephone conversation causes main control circuit 51 to proceed through the steps of FIG. 11 to the fixed function routine FIG. (14). After determining that the input is from a HOLD key and that the hook flag is set to zero, the HOLD flag is set to "one" during the "data processing" step. The program then branches to YES after the decision "HOLD key" and determines, from the stored function assignment patterns for all key telephone sets, which sets have a CO key corresponding to the office line 30 which is being held. Indicators DS adjacent the CO key for that office line are then caused to "wink," a well-known HOLD indication.

Main control circuit 51 then determines the state of the INT flag and, if it is set to "zero" as it is assumed to be here, proceeds to the step "call processing." In this step, the connection between the particular key telephone set A and office line 30 is broken at cross point 60, but office line 30 is held.

If the operator then returns the receiver to the hook switch, this key input causes main control circuit 51 to follow the steps of FIG. 11 to the finish routine. Here, as shown in FIG. 13, the hook flag is set to "one. In the next step, "data processing," ordinarily the CO2 key flag would be initialized (set to "zero"). However, since the HOLD flag corresponding to the CO2 key is still "one," the CO2 key flag is also maintained in the "one" state. Consequently, during the succeeding steps of the finish routine no changes are made, either in displays or telephone interconnections. Therefore, during holding, if the receiver is placed on-hook, the HOLD condition is not released.

Internal Calls

It is assumed here that the key telephone set A being used to make the call has an INT1 key. Referring to FIG. 11, when the receiver of the calling set is taken off-hook, this key input is read by main control circuit 51 which then sets the hook flag to "zero" as described above. Next, the operator presses the INT1 key, and the program proceeds to the assigned function routine of FIG. 13. There, the INT1 key flag is set to "one," and the indicators DS corresponding to the INT1 keys of all key telephone sets which have them are illuminated. This brings the program to the step of "call processing" in which main control circuit 51 connects the calling key telephone set A to its telephone interface 10, and a dial tone is heard.

When the operator inputs, through the numerical keypad 200, the extension number of the key telephone set being called, the program steps of FIG. 11 are followed to the fixed function routine. There, since the hook flag is set to "zero" (off-hook), the program reaches the step of "data processing" in which the extension number that has been entered is stored by main control circuit 51. Main control circuit 51 then proceeds through the fixed function routine, reaching the decision "extension number input?" At this point, main control circuit 51 determines whether there is a key telephone set A whose extension number is the same as the stored data. If there is not, it sends a busy signal to the calling key telephone set during the step of "call processing." If there is such a key telephone set A, the step of "extension ringing processing" is performed.

In this step, the flags for the called key telephone set are first checked to determine whether it is busy. If so, a busy tone is send to the calling set via cross point 60 and telephone interface 10 from the tone oscillator. If the called set is not busy, it is connected to its telephone interface 10, a ringing signal is sent to the telephone interface 10 of the called set, and a ring back tone is sent to the telephone interface 10 of the calling set.

Inhibited Ringing

The DND key may be operated to inhibit ringing of a telephone set whether the receiver is on- or off-hook. In the assigned function routine (FIG. 13), the program proceeds through the decision "DND key" to the "data processing" step, where the DND flag for that set is set to "one." In the next step, the indicator DS corresponding to the DND key is illuminated on that key telephone set. Depressing the DND key again causes the flag to be set to "zero" and the indicator to be extinguished. (If a set where the DND flag is "one" is called, it responds as if it is busy.)

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

We claim:

1. Apparatus simultaneously assigning a chosen function to each of a plurality of assignable function keys on a key telephone set, said apparatus comprising:
    memory means for storing a plurality of predetermined arrays of function assignments,
    data input means coupled to said memory means for selecting the one of the stored arrays having the chosen functions corresponding to said assignable function keys; and
    control means coupled to said set and said data input means for assigning the functions of said assignable function keys in accordance with the selected array.

2. The apparatus of claim 1 wherein said key telephone set is a designated one of a plurality of key telephone sets coupled to said control means, said data input means further designating said key telephone set.

3. Apparatus simultaneously assigning a chosen function to each of a plurality of assignable function keys on a key telephone set, said apparatus comprising:
    memory means for storing a plurality of predetermined arrays of function assignments, said arrays including at least a first type of array corresponding to a first type of key telephone set and a second type of array corresponding to a second type of key telephone set,
    data input means coupled to said memory means for selecting the one of the stored arrays having the chosen functions corresponding to said assignable function keys; and
    control means coupled to said set and said data input means for assigning the functions of said assignable function keys simultaneously in accordance with the selected array.

4. The apparatus of claim 2 further comprising second memory means coupled to said control means for storing the identity of the selected array and of said designated set, said control means further writing the identities into said second memory means.

5. The apparatus of claim 2 wherein at least one of said key telephone sets has a different number of assignable function keys from at least another one of said key telephone sets.

6. The apparatus of claim 2 wherein said data input means comprises a predetermined one of said key telephone sets.

7. The apparatus of claim 6 wherein said predetermined key telephone set includes a plurality of function keys operable to designate said key telephone set and select the function assignment pattern.

* * * * *